(12) United States Patent
Matsushima

(10) Patent No.: US 8,866,934 B2
(45) Date of Patent: Oct. 21, 2014

(54) IMAGE PICKUP APPARATUS CAPABLE OF DELETING VIDEO EFFECT SUPERIMPOSED ON MOVING IMAGE, METHOD OF CONTROLLING THE APPARATUS, AND MOVING IMAGE-RECORDING APPARATUS, AS WELL AS STORAGE MEDIUM

(75) Inventor: Shuichiro Matsushima, Tokyo (JP)

(73) Assignee: Canon Kabushiki Kaisha (JP)

( * ) Notice: Subject to any disclaimer, the term of this patent is extended or adjusted under 35 U.S.C. 154(b) by 224 days.

(21) Appl. No.: 13/294,323

(22) Filed: Nov. 11, 2011

(65) Prior Publication Data

US 2012/0127349 A1    May 24, 2012

(30) Foreign Application Priority Data

Nov. 18, 2010  (JP) ................. 2010-257772

(51) Int. Cl.
*H04N 5/262* (2006.01)
*H04N 5/232* (2006.01)
*H04N 5/77* (2006.01)
*H04N 9/82* (2006.01)

(52) U.S. Cl.
CPC ............ *H04N 5/2621* (2013.01); *H04N 9/8205* (2013.01); *H04N 5/23216* (2013.01); *H04N 5/772* (2013.01)
USPC ...................................................... 348/239

(58) Field of Classification Search
CPC ... H04N 5/272; H04N 5/232; H04N 5/23248; H04N 5/23293; H04N 5/772; H04N 2101/00
USPC ......... 348/208.16, 231.3, 231.5, 239, 240.99, 348/333.01, 333.02, 333.12, 143, 154
See application file for complete search history.

(56) References Cited

U.S. PATENT DOCUMENTS

| 5,515,101 | A | * | 5/1996 | Yoshida | 348/239 |
| 7,265,851 | B2 | * | 9/2007 | Kinjo | 358/1.1 |
| 7,817,202 | B2 | * | 10/2010 | Ogasawara et al. | 348/333.03 |
| 8,049,794 | B2 | * | 11/2011 | Raynor et al. | 348/239 |
| 2006/0092295 | A1 | * | 5/2006 | Mercer | 348/239 |
| 2009/0322885 | A1 | | 12/2009 | Ogasawara et al. | |
| 2010/0091142 | A1 | * | 4/2010 | Iijima | 348/239 |

FOREIGN PATENT DOCUMENTS

| EP | 2 034 715 A1 | 3/2009 |
| EP | 2 387 002 A2 | 11/2011 |
| JP | 06-261276 A | 9/1994 |
| JP | 2006-050425 A | 2/2006 |
| JP | 2006-129501 A | 5/2006 |

OTHER PUBLICATIONS

Combined Search and Examination Report issued in Counterpart Application, GB1119587.2, dated Mar. 19, 2012.
Japanese Office Action for corresponding JP 2010-257772, mail date Jun. 24, 2014.

* cited by examiner

*Primary Examiner* — Lin Ye
*Assistant Examiner* — Chriss Yoder, III
(74) *Attorney, Agent, or Firm* — Rossi, Kimms & McDowell LLP

(57) ABSTRACT

An image pickup apparatus capable of deleting a video effect superimposed on a moving image, in timing desired by a user. A system controller of a video camera as the image pickup apparatus performs control such that a moving image taken by an image pickup section and a title superimposed on the moving image are recorded together in a storage medium. When a specific shooting condition has changed during taking of the moving image by the image pickup section, the system controller performs control to inhibit recording of the display item in the storage medium.

26 Claims, 6 Drawing Sheets

IMAGE PICKUP APPARATUS CAPABLE OF DELETING VIDEO EFFECT SUPERIMPOSED ON MOVING IMAGE, METHOD OF CONTROLLING THE APPARATUS, AND MOVING IMAGE-RECORDING APPARATUS, AS WELL AS STORAGE MEDIUM

BACKGROUND OF THE INVENTION

1. Field of the Invention

The present invention relates to an image pickup apparatus, such as a video camera, which is capable of recording a moving image, a method of controlling the apparatus, and a moving image-recording apparatus, as well as a storage medium, and more particularly to moving image superimposition control for shooting and recording a moving image while superimposing thereon a display item, such as a title for identifying the moving image.

2. Description of the Related Art

In general, a video effect can be added to a moving image taken by an image pickup apparatus, such as a video camera, so as to improve the work quality of the moving image (also referred to as the moving picture). For example, character strings, such as a title and subtitles or captions, are sometimes superimposed as video effects on a moving image. Further, still figures or animated figures are sometimes added as video effects.

It is desirable that a user can delete such video effects mentioned above, on an as-needed basis. For this reason, an image pickup apparatus can be configured to enable the user to delete a video effect by operating buttons and the like of a console section with a timing desired by the user.

However, the user, who intends to delete the video effect during moving image shooting, typically has to carry out button operation in addition to shooting operation, which can hinder the user from focusing his/her attention on the shooting operation, making the same unsuccessful.

On the other hand, in a case where an image pickup apparatus is configured to be capable of automatically deleting a video effect when a predetermined time period elapses after the video effect was superimposed on a moving image, a video image cannot always be deleted with a timing desired by the user.

As a method of automatically superimposing a video effect on a moving image, there has been proposed a technique of superimposing a video effect, such as a title image or a voice, on a moving image e.g. in synchronism with the motion of an object and the acceleration of the same (see Japanese Patent Laid-Open Publication No. H06-261276).

However, the method disclosed in Japanese Patent Laid-Open Publication No. H06-261276 provides a desired effect only when an object is moving. In shooting of a still object, such as a landscape, it is impossible to delete a video effect automatically.

SUMMARY OF THE INVENTION

The present invention provides an image pickup apparatus which is capable of deleting a video effect superimposed on a moving image, with a timing desired by a user, irrespective of the motion of an object, a method of controlling the image pickup apparatus, and a moving image-recording apparatus, as well as a storage medium.

In a first aspect of the present invention, there is provided an image pickup apparatus comprising an image pickup unit, a recording control unit configured to perform control to record, together with a moving image taken by the image pickup unit, a display item superimposed on the moving image, and a control unit configured to be operable when a specific shooting condition has changed during taking of the moving image by the image pickup unit, to perform control to inhibit recording of the display item together with the moving image by the recording control unit.

In a second aspect of the present invention, there is provided a method of controlling an image pickup apparatus including an image pickup unit, comprising performing control to record, together with a moving image taken by the image pickup unit, a display item superimposed on the moving image, and performing control, when a specific shooting condition has changed during taking of the moving image by the image pickup unit, to inhibit recording of the display item together with the moving image.

In a third aspect of the present invention, there is provided a non-transitory storage medium storing a program for causing a computer to carry out the method of controlling the image pickup apparatus.

In a fourth aspect of the present invention, there is provided a moving image-recording apparatus comprising a recording control unit configured to perform control to record, together with a moving image, a display item superimposed on the moving image, and a control unit configured to be operable when a result obtained by analyzing the moving image satisfies a specific condition during recording of the moving image by the recording control unit, to perform control to inhibit recording of the display item together with the moving image by the recording control unit.

In a fifth aspect of the present invention, there is provided a method of controlling a moving image-recording apparatus, comprising performing control to record, together with a moving image, a display item superimposed on the moving image, and performing control, when a result obtained by analyzing the moving image satisfies a specific condition during recording of the moving image, to inhibit recording of the display item together with the moving image.

In a sixth aspect of the present invention, there is provided a non-transitory storage medium storing a program for causing a computer to carry out the method of controlling the moving image-recording apparatus.

According to the present invention, it is possible to delete a display item as a video effect superimposed on a moving image during recording of the moving image, without necessitating special user operation. That is, the present invention provides an advantageous effect that a video effect superimposed on a moving image can be deleted in timing intended by the user, irrespective of the motion of an object.

Further features of the present invention will become apparent from the following description of exemplary embodiments with reference to the attached drawings.

BRIEF DESCRIPTION OF THE DRAWINGS

FIGS. 2A to 2D are views useful in explaining a process of inputting a title by handwriting or user defined text inputting and superimposing the title on a camera-through image, performed by the camera shown in FIG. 1, in which FIG. 2A shows a screen displayed on a display section during suspension of recording in a camera mode, FIG. 2B shows a screen displayed on the display section in a handwriting or text input mode, FIG. 2C shows an example of a title on a screen in the handwriting mode, and FIG. 2D shows a screen displayed after the digital video camera has returned from the handwriting mode to the recording-suspended state in the camera mode, with the title thereon.

FIGS. 3A to 3C are views useful in explaining menu settings to be configured for handwriting-superimposed recording performed by the camera shown in FIG. 1, in which FIG. 3A shows a camera configuration menu screen, FIG. 3B shows a handwritten data recording configuration screen, and FIG. 3C shows a detailed configuration screen.

FIGS. 4A to 4D are views useful in explaining screens displayed in the camera in FIG. 1 in a case where title deletion is automatically performed when a distant scene image is a background of a title, in which FIG. 4A shows an example of a screen displayed during suspension of recording, FIG. 4B shows a state where a title has been generated anew or read out in a handwriting input mode, FIG. 4C shows one scene of a moving image having the title superimposed on a background image after starting recording, and FIG. 4D shows a screen displayed after completion of title deletion processing.

DESCRIPTION OF THE EMBODIMENTS

The present invention will now be described in detail below with reference to the accompanying drawings showing an embodiment thereof.

Figure 1:
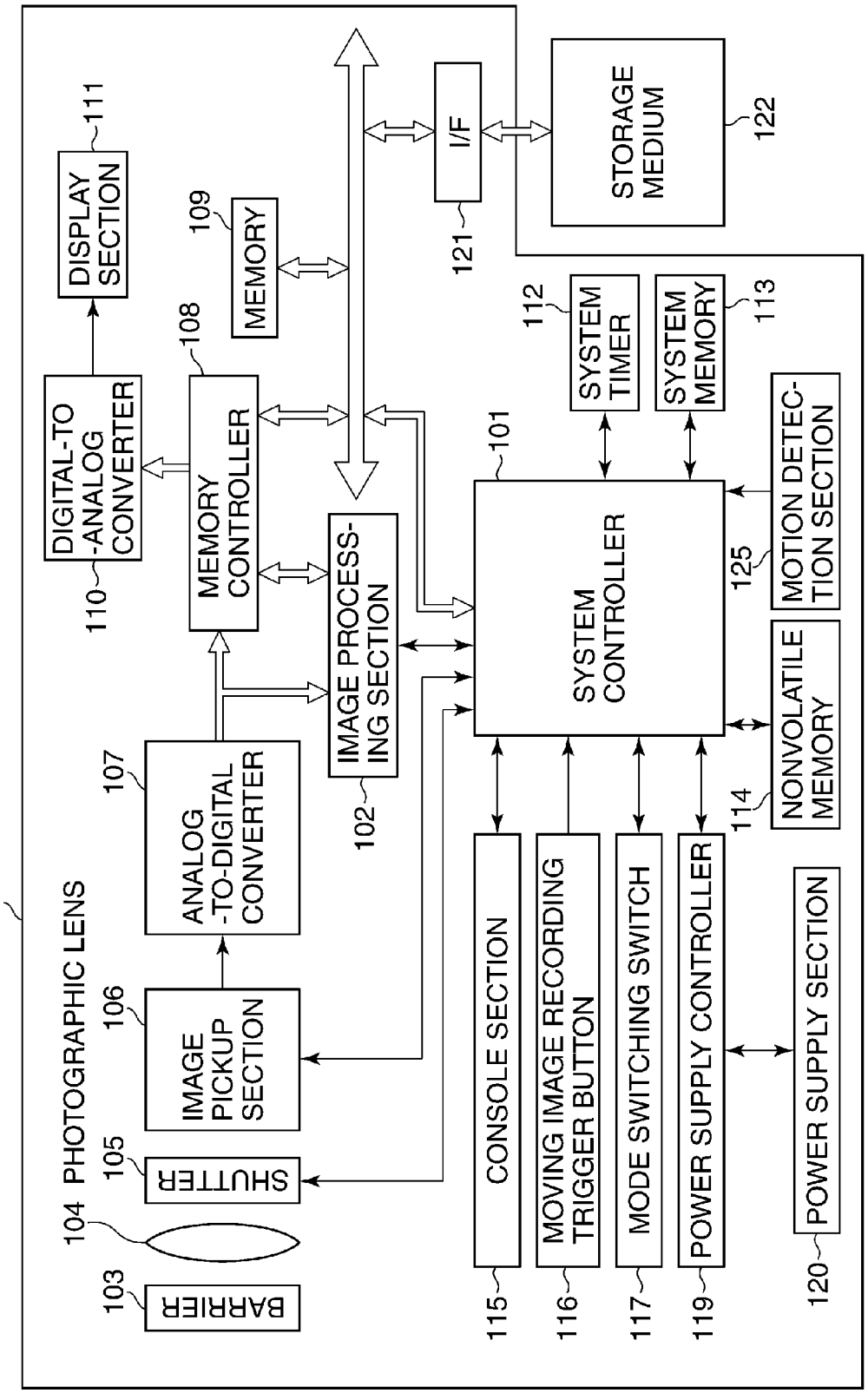
FIG. 1 is a block diagram of a digital video camera as an image pickup apparatus according to an embodiment of the present invention.

FIG. 1 is a block diagram of a digital video camera as one of image pickup apparatuses according to the embodiment of the present invention.

As shown in FIG. 1, the digital video camera (hereinafter simply referred to as "the camera") denoted by reference numeral 100 has a photographic lens 104, a shutter 105, and an image pickup section 106. The photographic lens 104 includes a focus lens. The shutter 105 is provided with a diaphragm function and an ND (neutral density) filter function. The image pickup section 106 is implemented e.g. by a CCD or CMOS device for converting an optical image to an electrical signal (analog image signal). The electrical signal output from the image pickup section 106 is converted to a digital signal (digital image signal) by an analog-to-digital converter 107.

Note that the camera 100 is provided with a barrier 103, and the barrier 103 covers the image pickup section 106 including the photographic lens 104 so as to prevent an image pickup system including the photographic lens 104, the shutter 105, and the image pickup section 106 from being soiled or broken.

The output from the analog-to-digital converter 107, i.e. the digital signal is delivered to an image processing section 102. The image processing section 102 performs predetermined pixel interpolation, resizing, such as image size reduction, and color conversion on the digital signal, and outputs the resulting image data.

Note that the image processing section 102 performs the same processing as mentioned above also on image data delivered from a memory controller 108.

Further, the image processing section 102 performs a predetermined computation process according to image data, and a system controller 101 performs exposure control and range finding control based on a computation result obtained by the computation process. More specifically, the system controller 101 performs an AF (autofocus) process and an AE (automatic exposure) process by the TTL (through-the-lens) method.

The AE process is performed by controlling the shutter speed, the diaphragm, and the ND filter as well as the gain of an image signal in the image processing section 102. In addition, the image processing section 102 performs an AWB (automatic white balance) process by the TTL method, based on the computation result.

In general, in a moving image shooting mode, the AF process, the AE process, and the AWB process are executed on a real-time basis. Further, when the settings of automatic execution of the AF process, the AE process, and the AWB process are cancelled, it is possible to manually set each of the processes.

As described hereinbefore, the output from the analog-to-digital converter 107 is processed by the image processing section 102, and is then written as image data into a memory 109 by the memory controller 108. Note that the output from the analog-to-digital converter 107 can be directly written as image data into the memory 109 via the memory controller 108.

The memory 109 has a sufficient storage capacity for storing a moving image and voices recorded over a predetermined time period. In the example shown in FIG. 1, the memory 109 also functions as a memory (video memory) for image display.

The memory controller 108 causes a digital-to-analog converter 110 to convert image data for image display, which is stored in the memory 109, to an analog image signal and deliver the analog image signal to a display section 111. The display section 111 is implemented e.g. by an LCD (liquid crystal display). The display section 111 performs image display according to the analog image signal output from the digital-to-analog converter 110.

Image data converted from analog to digital by the analog-to-digital converter 107 is accumulated in the memory 109, as described hereinbefore. Then, the image data accumulated in the memory 109 is converted to an analog image signal by the digital-to-analog converter 110 and is sequentially transferred to the display section 111. Thus, a function as an electronic view finder (through image display) can be realized.

A nonvolatile memory 114 is capable of performing electrical deletion and recording. In the illustrated example, the nonvolatile memory 114 is implemented by an EEPROM. The nonvolatile memory 114 stores operation constants for the system controller 101, control programs, and so forth. The control programs are provided for performing various operations described hereinafter, for example.

The system controller 101 controls the overall operation of the camera 100. The system controller 101 executes the above-mentioned control programs stored in the nonvolatile memory 114, to thereby carry out processes (operations) described hereinafter.

In the illustrated example, a system memory 113 is implemented by a RAM. The operation constants and variables used by the system controller 101, and control programs read from the nonvolatile memory 114 are loaded into the system memory 113. Further, the system controller 101 controls the memory 109, the digital-to-analog converter 110, and the display section 111 to thereby perform display control.

A system timer (shooting clock unit) 112 is a clock section for measuring time for each of various control processes, and measuring time for clock functions of built-in clocks. Various operation instructions are input to the system controller 101 from a mode switching switch 117, a moving image recording trigger button 116, and a console section 115.

The system controller 101 operates the mode switching switch 117 to switch the operation mode of the camera 100 to a moving image-recording mode or a moving image-reproducing mode. The system controller 101 operates the moving image recording trigger button 116 to start a sequence of operations for the shooting process from signal reading from the image pickup section 106 to image data writing in a storage medium 122.

When one of various function icons displayed on the display section 111 is selectively operated, a function is assigned to an associated one of operation controls provided on the console section 115, as deemed appropriate, on a scene-by-scene basis, and the operation controls function as function buttons.

The function buttons include a menu button, an end button, a return button, an image scroll button, a jump button, a narrowing button, and an attribute change button, for example. When the menu button is pressed, for example, a menu screen that allows configuration of various settings is displayed on the display section 111. A user can intuitively configure various settings using the menu screen displayed on the display section 111, four directional buttons, and a SET button.

A power supply controller 119 includes a battery detection circuit, a DC-to-DC converter, and a switch circuit for switching between blocks to be energized, and detects the presence/absence of a mounted battery, the type of the battery, and remaining battery power. Further, the power supply controller 119 controls the DC-to-DC converter based on a detection result and an instruction from the system controller 101 to supply a necessary voltage to each of the blocks including the storage medium 122 over a required time period.

A power supply section 120 includes a primary battery, such as an alkaline battery or a lithium battery, a secondary battery, such as a NiCd (Nickel-cadmium) battery, a NiMH (Nickel-metal hydride) battery, or a Li-ion (Lithium-ion) battery, and an AC adapter, for example. The camera 100 is connected to the storage medium 122, such as a memory card or a hard disk, via an interface 121.

The storage medium 122 is implemented e.g. by a semiconductor memory or a magnetic disk. The storage medium 122 appearing in FIG. 1 is removable from the camera 100, but it may be built into the camera 100. Further, the camera 100 may be provided with both the removable storage medium 122 and the built-in storage medium.

Now, a description will be given of a face detection function. The system controller 101 delivers image data as a target for face detection to the image processing section 102. Under the control of the system controller 101, the image processing section 102 causes a horizontal band-pass filter to act on the image data.

Further, under the control of the system controller 101, the image processing section 102 causes a vertical band-pass filter to act on the image data processed with the horizontal band-pass filter. Edge components of the image data are detected by processing with the horizontal and vertical band-pass filters.

Thereafter, the system controller 101 performs pattern matching on the detected edge components to thereby extract candidate groups for eyes, a nose, a mouth, and ears. Then, the system controller 101 determines that a portion of each candidate of the extracted candidate groups, which satisfies a predetermined condition (e.g. a distance between two eyes, an inclination therebetween, etc.), is an eye pair, and narrows the extracted candidate groups to an eye candidate group, each candidate of which includes an eye pair.

Then, the system controller 101 generates face information by associating each candidate of the narrowed eye candidate group with other parts (a nose, a mouth, and ears). Further, the system controller 101 performs face detection using a preset non-face condition filter.

The system controller 101 outputs the face information according to a result of the face detection, followed by terminating the face detection processing. At this time, the system controller 101 stores feature values including the number of faces in the memory 109.

By thus performing image analysis on image data displayed in live view or for reproduction and then extracting the feature values of the image data, it is possible to detect object information (i.e. face information). Although in the above description, face information is mentioned as an example of object information, various other information items, such as smiling face detection information and the like, can also be used as object information.

Next, a description will be given of a camera shake detection function and a camera shake correction method.

Under the control of the system controller 101, the image processing section 102 samples a digital image signal at predetermined time intervals and performs so-called vector detection during each sampling period to thereby detect a vector change rate as a camera shake amount. Then, the image processing section 102 segments the digital image signal such that the camera shake amount becomes zero, to thereby perform camera shake correction. In the present embodiment, the method in which vector detection is used for camera shake correction will be referred to as the vector anti-shake.

A motion detection section 125, which is implemented by an acceleration sensor or a gyro sensor, is connected to the system controller 101, and an output therefrom is converted to a digital signal, whereby a camera shake amount is detected. The system controller 101 controls the photographic lens 104 in a direction for canceling the camera shake, whereby the camera shake is corrected. This method will be referred to as the optical anti-shake. By using the vector anti-shake and the optical anti-shake at the same time, it is possible to improve the effect of camera shake correction.

Next, a detailed description will be given of the console section 115.

In the illustrated example, the console section 115 has a touch panel that is capable of detecting a touch on the display section 111. The touch panel and the display section 111 can be integrally formed with each other. For example, the touch panel is mounted to the display section 111 such that the display of the display section 111 is not hindered by the light transmittance of the touch panel. By associating input coordinates on the touch panel with display coordinates on the display section 111, it is possible to configure a GUI (graphical user interface) which enables the user to directly operate a screen displayed on the display section 111.

The system controller 101 detects the following operations on the touch panel:

(1) an operation of touching the touch panel by a finger or a pen (hereinafter referred to as "a touch-down");

(2) a state of the touch panel having been touched by the finger or the pen (hereinafter referred to as "a touch-on");

(3) an operation of moving the finger or the pen on the touch panel while being kept in contact with the same (hereinafter referred to as "a move");

(4) an operation of moving the finger or the pen off the touch panel (hereinafter referred to as "a touch-up"); and (5) a state of the touch panel is not being touched by anything (hereinafter referred to as "a touch-off").

Information indicative of the above-mentioned operations and the coordinate positions on the touch panel at which the finger or the pen has touched is sent as position information to the system controller 101. The system controller 101 determines, based on the position information, what operation has been performed on the touch panel.

As for a move, the system controller 101 determines vertical and horizontal components of the direction of movement of the finger or the pen moving on the touch panel, based on change of the coordinate position.

Further, when the touch panel is touched down and then touched up after a certain move, a stroke is drawn. An operation of drawing a stroke quickly will be referred to as "a flick".

The flick is an operation of quickly moving a finger for a certain distance while being held in contact with the touch panel and then moving the finger off the same. In other words, the flick is an operation of quickly moving a finger on the touch panel as if flicking the finger against the touch panel. When detecting that a move of a predetermined distance or more has been performed at a predetermined speed or higher and detecting a touch-up in the state, the system controller 101 determines that a flick has been performed.

On the other hand, when detecting that a move of a predetermined distance or more has been performed at a speed lower than the predetermined speed, the system controller 101 determines that a drag has been performed. Note that the touch panel may be implemented by any one of various types, such as a resistive film type, a capacitive type, a surface acoustic wave type, an infrared type, an electromagnetic induction type, an image recognition type, and an optical sensor type.

Next, a description will be given of a method of superimposing a title as a video effect on a moving image. In this example, the title is one of display items for identifying a moving image.

For example, the user can input a title by handwriting characters using the touch panel. Now, a process of inputting of a title by handwriting and superimposing the title on a camera-through image will be described by taking a user interface (UI) displayed on the display section 111, as an example.

Figure 2A:
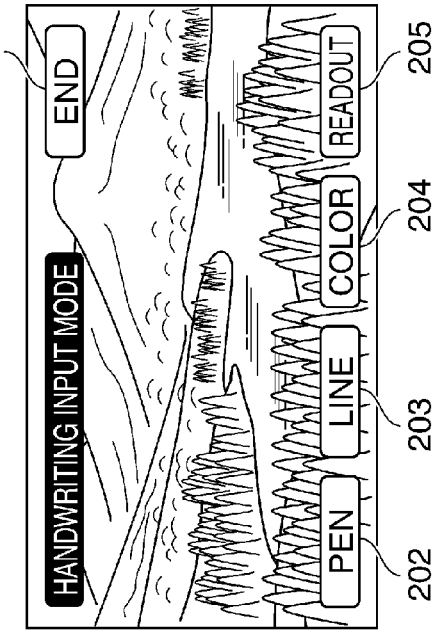
Figure 2B:
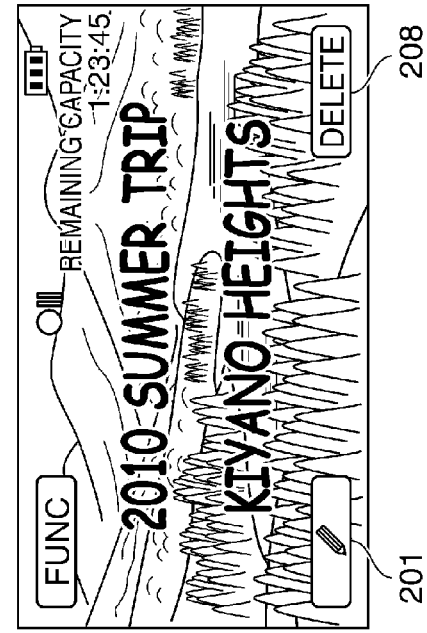
Figure 2C:
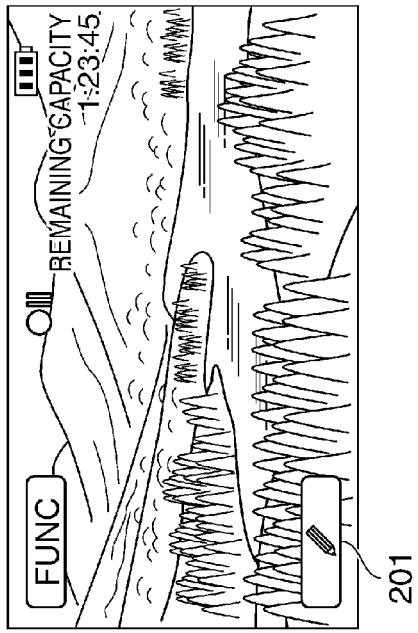
Figure 2D:
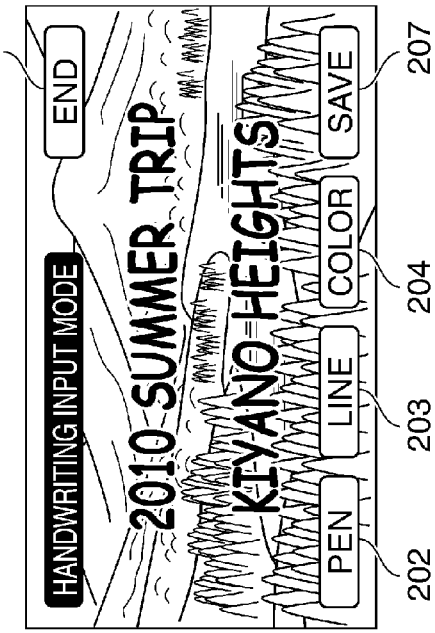

FIGS. 2A to 2D are views useful in explaining an example of the process of inputting a title by handwriting and superimposing the title on a camera-through image, which is performed by the camera 100 shown in FIG. 1. FIG. 2A shows a screen displayed on the display section 111 during suspension of recording in a camera mode. FIG. 2B shows a screen displayed on the display section 111 in a handwriting mode. FIG. 2C shows an example of a title handwritten on a screen in the handwriting mode, and FIG. 2D shows a screen displayed after the camera 100 has returned from the handwriting mode to the recording-suspended state in the camera mode, with the title handwritten thereon.

When the user presses a handwriting mode button 201 on the touch panel during suspension of recording in the camera mode shown in FIG. 2A, the system controller 101 shifts to a handwriting input mode and displays the screen shown in FIG. 2B on the display section 111.

Arranged on the screen shown in FIG. 2B are a pen type button 202, a line thickness and type button 203, a color change button 204, and a readout button 205. The user configures the handwriting input mode as desired using the buttons 202 to 204 and performs handwriting input on the screen (i.e. the camera-through screen). The readout button 205 is used for selectively reading out and displaying handwritten contents which were stored in the storage medium 122, on the screen.

When the user performs handwriting input on the screen shown in FIG. 2B, the system controller 101 displays the screen shown in FIG. 2C on the display section 111 via the memory controller 108 according to the handwriting input. At this time, the system controller 101 displays an end button 206 and a save button 207 on the screen. When the user presses the save button 207 on the screen shown in FIG. 2C, the system controller 101 stores the handwritten contents in the storage medium 122 together with the image.

When the user presses the end button 206 after completion of the handwriting input, the system controller 101 returns from the handwriting input mode to the camera mode in its recording-suspended state and displays the handwritten contents (handwritten title) and the image on the display section 111 (see FIG. 2D). At this time, a delete button 208 is displayed on the screen (camera-through screen).

When the user presses the moving image recording trigger button 116 in the state shown in FIG. 2D, the system controller 101 starts moving image recording with the handwritten title superimposed on the image. When the user presses the delete button 208, the system controller 101 deletes the title superimposed on the image. Note that the delete button 208 is available both during suspension of recording and during recording. When the user presses the delete button 208 during recording, the system controller 101 terminates superimposition of the title on the moving image.

Next, a description will be given of menu settings configured in the case of performing handwriting-superimposed recording by the camera 100 shown in FIG. 1.

Figure 3A:
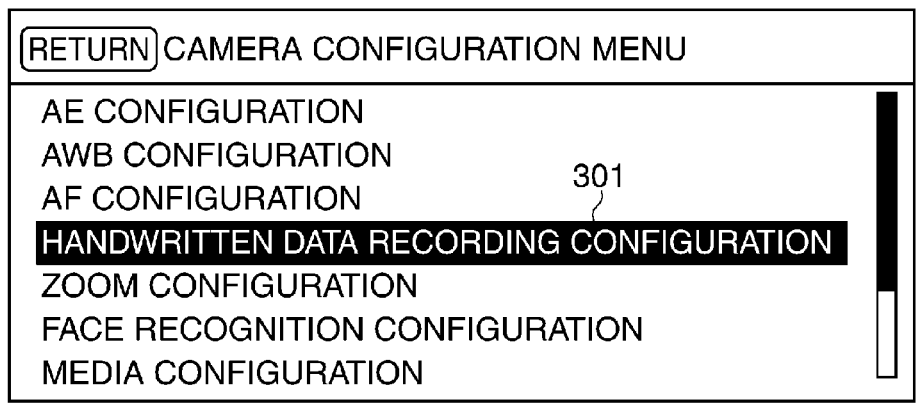
Figure 3B:
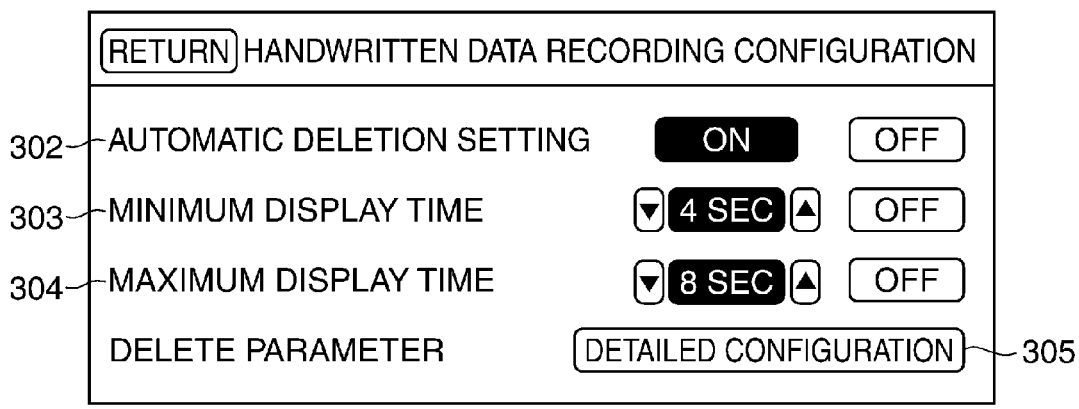
Figure 3C:
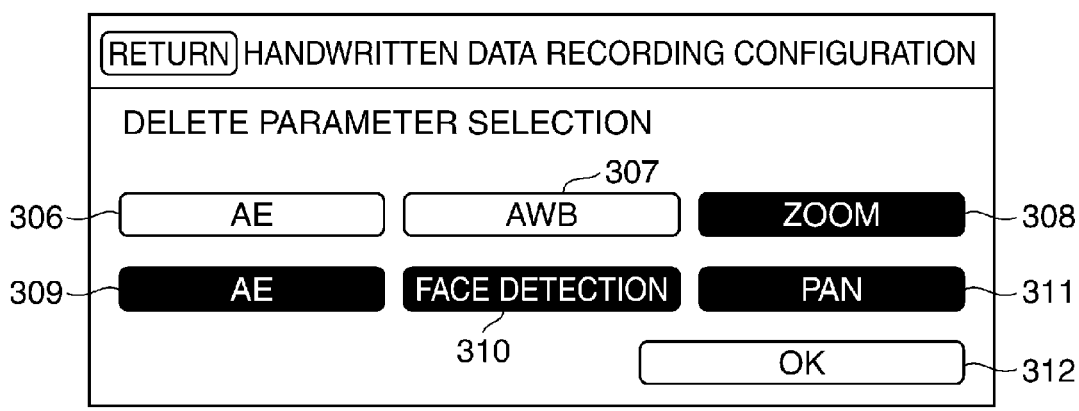

FIGS. 3A to 3C are views useful in explaining menu settings configured in the case of performing handwriting-superimposed recording performed by the camera 100 shown in FIG. 1. FIG. 3A shows a camera configuration menu screen, and FIG. 3B shows a handwritten data recording configuration screen. FIG. 3C shows a detailed configuration screen.

Now, it is assumed that the camera configuration menu screen (see FIG. 3A) is currently displayed on the display section 111 appearing in FIG. 1. When the user selects a menu option of handwritten data recording configuration 301 on the camera configuration menu screen, the system controller 101 displays the handwritten data recording configuration screen in FIG. 3B on the display section 111 via the memory controller 108. On the handwritten data recording configuration screen in FIG. 3B, the user can configure an automatic deletion setting 302, a minimum display time 303, a maximum display time 304, and a delete parameter.

Referring to FIG. 3B, the automatic deletion setting 302 is a setting as to whether or not to automatically delete a title superimposed on a moving image. When the automatic deletion setting 302 is set to ON, the system controller 101 deletes the title according to conditions corresponding to settings of setting items, described hereinafter. On the other hand, in a case where the automatic deletion setting 302 is set to OFF, when the user presses the delete button 208 displayed on the screen during recording, the system controller 101 deletes the title. In short, the user can delete the title at a desired timing.

When a detailed configuration button 305 appearing in FIG. 3B is pressed, the system controller 101 displays the detailed configuration screen (additional configuration screen) on the display section 111 (see FIG. 3C). The user can select a delete parameter on the detailed configuration screen.

The delete parameter is used to designate a camera condition (also referred to as "a shooting condition") for automatically deleting a title. When the camera condition (shooting condition) changes by a predetermined amount or more from the state where the title is superimposed on the moving image, the system controller 101 executes a process for automatically deleting the title, as described hereinafter.

A change in the camera condition (shooting condition) corresponds to a change in an object and the camera angle, so that the automatic title deletion process is effective for deleting a title in a case where the title is superimposed on a specific camera-taken image.

In the example shown in FIG. 3C, the user can select one parameter or a combination of two or more parameters from an auto exposure (AE) 306, an auto white balance (AWB) 307, a zoom 308, an autofocus (AF) 309, a face detection 310, and a pan (camera panning) 311.

When any of the buttons appearing in FIG. 3C is pressed, the system controller displays the pressed button in reverse video. Then, when an OK button 312 is pressed, the system controller 101 displays the handwritten data recording configuration screen (see FIG. 3B) on the display section 111.

Referring to FIG. 3B, the minimum display time 303 is a setting for ensuring a minimum time period for title superimposition. When a camera condition (shooting condition) abruptly changes immediately after the start of title superimposition, it sometimes occurs that a title disappears before sufficiently providing the effect of title display. The minimum display time 303 is set so as to avoid occurrence of such inconvenience.

The minimum display time 303 can be changed in seconds using up and down buttons provided on the respective opposite right and left sides of a display of seconds. The setting of the minimum display time 303 can be canceled. In this case, the setting of the minimum display time 303 is set to OFF.

The maximum display time 304 is a setting for preventing a title from being left superimposed when a camera condition remains unchanged over a long time period. Similarly to the minimum display time 303, the setting of the maximum display time 304 can be switched between ON and OFF, and the maximum display time 304 can be changed in seconds when the setting is "ON"

Note that the minimum display time cannot exceed the maximum display time, and if the two are set to the same time period, the system controller 101 deletes a title when the same time period set as the minimum display time and the maximum display time has elapsed.

Figure 4B:
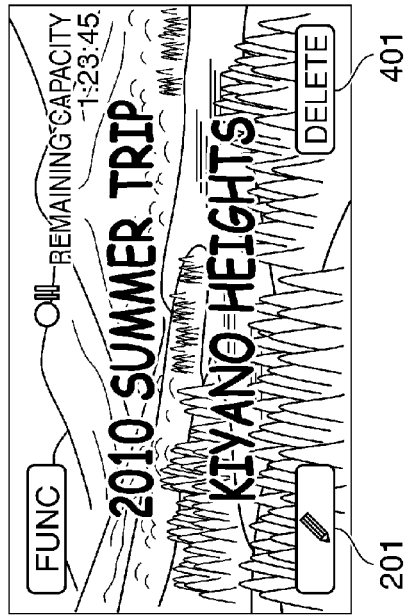
Figure 4D:
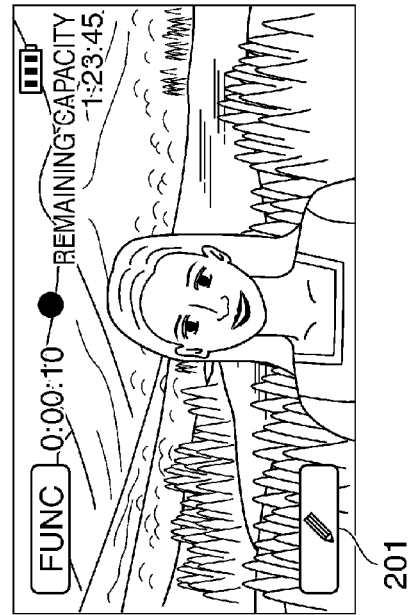
Figure 4A:
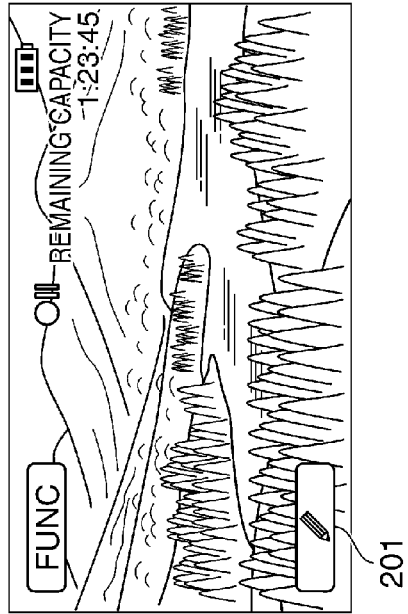
Figure 4C:
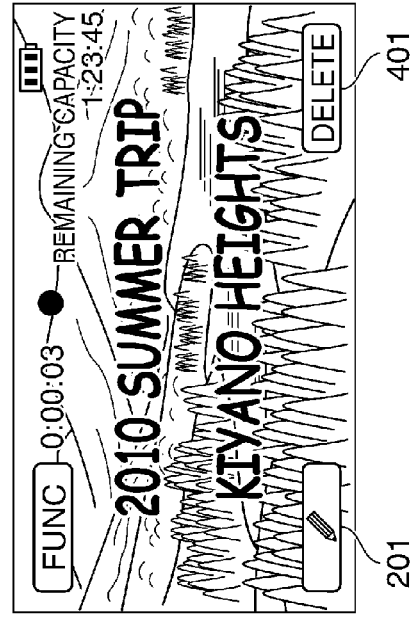

FIGS. 4A to 4D are views useful in explaining screens displayed in the camera 100 in FIG. 1 in a case where title deletion is automatically performed when a distant scene image is a background of a title. FIG. 4A shows an example of a screen displayed during suspension of recording. FIG. 4B shows a state where a title has been generated anew or read out in the handwriting input mode. FIG. 4C shows one scene of a moving image having the title superimposed on the background image after starting recording, and FIG. 4D shows a screen displayed after completion of the title deletion process.

Now, it is assumed that the screen shown in FIG. 4A is currently displayed on the display section 111 in the camera mode in its recording-suspended state, and in this state, a title is input by handwriting in the handwriting input mode as described with reference to FIGS. 2A to 2D. This causes a screen shown in FIG. 4B to be displayed on the display section 111. The screen shown in FIG. 4B is the same as the screen shown in FIG. 2D.

When recording is started after inputting the handwritten title as described above, the system controller 101 controls the memory controller 108 to record moving image data in the storage medium 122, with the title superimposed on a camera-taken image in the background (see FIG. 4C). More specifically, the handwritten display item (handwritten title) is combined with the camera-taken image in the background, and the synthesized video data is recorded in the storage medium 122, as a video frame of a moving image.

When a person appears on the screen within a time range between the minimum display time and the maximum display time, mentioned above, the system controller 101 performs the AF processing to thereby bring the focus from infinity to the person closer to the camera 100. At this time, the system controller 101 determines that the scene has been changed due to a change in focus, and executes processing for deleting the title on the image (see FIG. 4D). In the title deletion processing, the synthesis of the camera-taken image in the background and the handwritten display item (handwritten title) is stopped, and the display item (handwritten title) is deleted. As a consequence, the display item is deleted from the display section 111, and only the camera-taken image remains displayed on the same, as shown in FIG. 4D. Further, the recording of the display item (handwritten title) in the storage medium 122 is stopped. In short, frame images to be recorded in the storage medium 122 are restricted to the camera-taken image in the background having no display item (handwritten title) combined therewith.

Note that when the user presses a delete button 401 in the state where the title is superimposed on the image (see FIG. 4C), the system controller 101 deletes the title.

Although in the example shown in FIGS. 4A to 4D, the title is deleted from the image with a change in AF as a trigger, the trigger may be face detection performed when a person appears. Further, a change in exposure or white balance due to a change in angle, or a change in angle caused by a zoom operation by the user may be the trigger. In addition, a motion of a camera, such as a camera pan or a camera tilt, may be detected according to a change in camera attitude using a camera shake detection function, and the detected motion of the camera 100 may be used as a trigger. Further, by using a plurality of camera conditions in combination as a trigger, it is possible to further improve user-friendliness.

Now, a description will be given of deletion of a title superimposed on a moving image.

Figure 5:
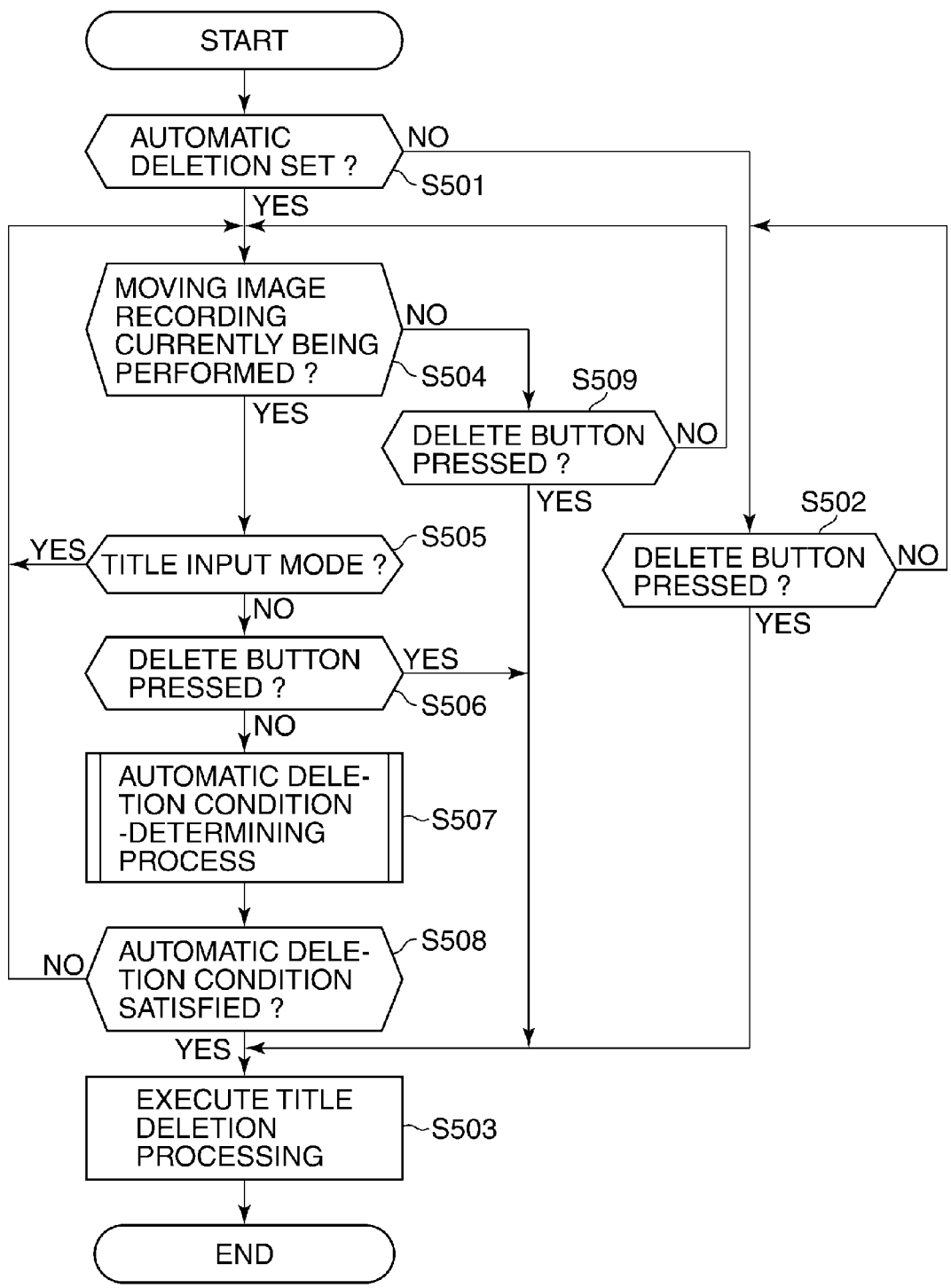
FIG. 5 is a flowchart of a title deletion control process for controlling the deletion of a title superimposed on a moving image, which is performed by the camera shown in FIG. 1.

FIG. 5 is a flowchart of a title deletion control process for controlling the deletion of a title superimposed on a moving image, which is performed by the camera 100 shown in FIG. 1.

Referring to FIGS. 1 and 5, it is assumed that the title is superimposed on the moving image in the same manner as described with reference to FIGS. 2A to 2D. First, the system controller 101 determines whether or not the automatic deletion setting in the menu screen has been set to ON (step S501).

If the automatic deletion setting has not been set to ON (NO to the step S501), the system controller 101 determines whether or not the delete button 401 for manual deletion has been pressed (step S502). If the delete button 401 has not been pressed (NO to the step S502), the system controller 101 waits.

If the delete button 401 has been pressed (YES to the step S502), the system controller 101 executes the title deletion processing as described above (step S503), followed by terminating the present process.

If the automatic deletion setting has been set to ON (YES to the step S501), the system controller 101 determines whether or not moving image recording (moving image shooting) is currently being performed (step S504). If the moving image recording is currently being performed (YES to the step S504), the system controller 101 determines whether or not title input is being performed, i.e. whether or not the camera 100 is currently in the handwriting input mode (title input mode) (step S505).

If the camera 100 is currently in the title input mode (YES to the step S505), automatic deletion is disabled, so that the system controller 101 holds a state of the title being displayed, until the camera 100 returns from the title input mode. Then, the system controller 101 returns the process to the step S504.

On the other hand, if the camera 100 is currently not in the title input mode (NO to the step S505), the system controller 101 determines whether or not the delete button 401 has been pressed (step S506). If the delete button 401 has been pressed (YES to the step S506), the system controller 101 proceeds to the step S503, wherein the system controller 101 executes the title deletion processing. This is because manual deletion takes priority over automatic deletion.

If the delete button 401 has not been pressed (NO to the step S506), the system controller 101 executes an automatic deletion condition-determining process (step S507). The automatic deletion condition-determining process will be described in detail hereinafter.

Then, the system controller 101 determines, based on a result of the automatic deletion condition-determining process, whether or not an automatic deletion condition has been satisfied (step S508). If the automatic deletion condition has been satisfied (YES to the step S508), the system controller 101 proceeds to the step S503, wherein the system controller 101 executes the title deletion processing.

On the other hand, if the automatic deletion condition has not been satisfied (NO to the step S508), the process returns to the step S504, and the system controller 101 continues the present process.

If it is determined in the step S504 that moving image recording is currently not being performed (NO to the step S504), the system controller 101 determines whether or not the delete button 401 has been pressed (step S509). If the delete button 401 has been pressed (YES to the step S509), the system controller 101 proceeds to the step S503, wherein the system controller 101 executes the title deletion processing. On the other hand, if the delete button has not been pressed (NO to the step S509), the process returns to the step S504, and the system controller 101 continues the present process.

Figure 6:
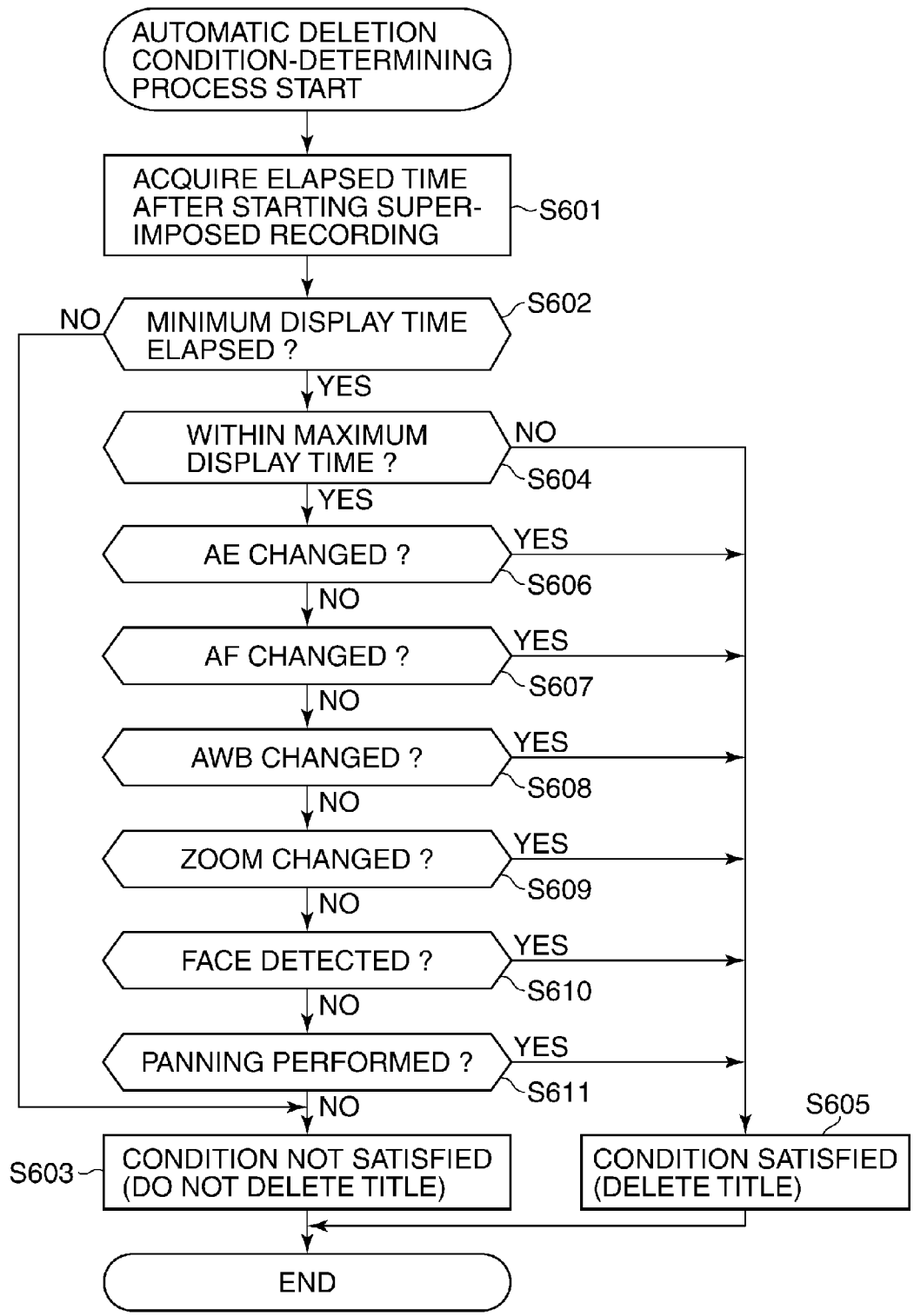
FIG. 6 is a flowchart of an automatic deletion condition-determining process executed in a step of FIG. 5.

FIG. 6 is a flowchart of the automatic deletion condition-determining process executed in the step S507 in FIG. 5.

Referring to FIGS. 1 and 6, when the automatic deletion condition-determining process is started, the system controller 101 acquires an elapsed time (measured time) having elapsed after the start of title-superimposed recording (superimposed shooting) from the system timer 112 (step S601). Then, the system controller 101 determines whether or not the elapsed time has satisfied the minimum display time (i.e. a predetermined time period) (step S602).

If the elapsed time has not satisfied the minimum display time, i.e. if the elapsed time is not longer than a first predetermined time period (NO to the step S602), since title deletion is disabled until the elapsed time reaches the minimum display time, the system controller 101 determines that the automatic deletion condition has not been satisfied (step S603), and terminate the automatic deletion condition-determining process. Then, the system controller 101 proceeds to the step S508 in FIG. 5.

If the elapsed time has exceeded the minimum display time (YES to the step S602), the system controller 101 determines whether or not the elapsed time is shorter than the maximum display time (step S604). If the elapsed time is not shorter than the maximum display time (NO to the step S604), the system controller 101 determines that the automatic deletion condition has been satisfied (step S605), and terminates the automatic deletion condition-determining process. Then, the system controller 101 proceeds to the step S508 in FIG. 5.

If the elapsed time is shorter than the maximum display time (YES to the step S604), i.e. if the elapsed time is not shorter than the minimum display time and shorter than the maximum display time, the system controller 101 sequentially determines whether or not the camera conditions (shooting conditions) have been satisfied, as follows:

First, the system controller 101 determines whether or not the AE (exposure) has been changed (step S606). In this step, the system controller 101 performs the determination based on the shutter speed value, the diaphragm value, the state of the ND filter, and the gain value of a picked-up image.

For example, when the amount of change in exposure is larger than a predetermined exposure change amount, the system controller 101 determines that the AE has been changed. If it is determined that the AE has been changed (YES to the step S606), the system controller 101 proceeds to the step S605, wherein the system controller 101 determines that the automatic deletion condition has been satisfied. Then, the system controller 101 proceeds to the step S508 in FIG. 5.

On the other hand, if it is determined that the AE has not been changed (NO to the step S606), the system controller 101 determines whether or not a focus position set by the AF has been changed (step S607). For example, when the amount of change in the focus position is larger than a predetermined focus change amount, the system controller 101 determines that the focus position has been changed. If it is determined that the focus position has been changed (YES to the step S607), the system controller 101 proceeds to the step S605, wherein the system controller 101 determines that the automatic deletion condition has been satisfied. Then, the system controller 101 proceeds to the step S508 in FIG. 5.

If it is determined that the focus position has not been changed (NO to the step S607), the system controller 101 determines whether or not the AWB has been changed (step S608). In this step, the system controller 101 determines whether or not the white balance setting parameter has been changed according to a change in color signal of the camera-taken image.

For example, when the amount of change in white balance is larger than a predetermined white balance change amount, the system controller 101 determines that the AWB has been changed. If it is determined that the AWB has been changed (YES to the step S608), the system controller 101 proceeds to the step S605, wherein the system controller 101 determines that the automatic deletion condition has been satisfied. Then, the system controller 101 proceeds to the step S508 in FIG. 5.

If it is determined that the AWB has not been changed (NO to the step S608), the system controller 101 determines whether or not the zoom has been changed (step S609). In this step, the system controller 101 determines, based on a user operation of the console section 115, whether or not the position of a zoom lens has been changed. For example, when the amount of change in the position of the zoom lens is larger than a predetermined zoom change amount, the system controller 101 determines that the position of the zoom lens has been changed.

If it is determined that the zoom has been changed (YES to the step S609), the system controller 101 proceeds to the step S605, wherein the system controller 101 determines that the automatic deletion condition has been satisfied. Then, the system controller 101 proceeds to the step S508 in FIG. 5. On the other hand, if it is not determined that the zoom has been changed (NO to the step S609), the system controller 101 determines whether or not a human face has been detected (step S610).

If a human face has been detected (YES to the step S610), the system controller 101 proceeds to the step S605, wherein the system controller 101 determines that the automatic deletion condition has been satisfied. Then, the system controller 101 proceeds to the step S508 in FIG. 5. On the other hand, if no human face has been detected (NO to the step S610), the system controller 101 proceeds to a step S611, wherein it is determined, by discriminating a camera motion using the camera shake detection function, whether a panning operation as a lateral camera shake, a tilting operation as a vertical camera shake, or a camera rotation has been performed (step S611).

If a panning or like operation has been performed (YES to the step S611), the system controller 101 determines that the camera angle has been moved, and proceeds to the step S605, wherein the system controller 101 determines that the automatic deletion condition has been satisfied. Then, the system controller 101 proceeds to the step S508 in FIG. 5. On the other hand, if no panning like operation has been performed (NO to the step S611), the system controller 101 determines in the step S603 that the automatic deletion condition has not been satisfied, and proceeds to the step S508 in FIG. 5.

The system controller 101 performs the automatic deletion condition-determining process as described above, but the order of the steps S606 to S610 in FIG. 6 may be changed, as desired.

In the above description, the automatic deletion condition-determining process is executed by performing determination as to all the camera conditions and the minimum display time and the maximum display time. However, since each of the setting items associated with these conditions is set to ON or OFF on the menu screens shown in FIGS. 3B and 3C, on condition that the automatic deletion setting is set to ON, the automatic deletion condition-determining process is executed based only on the setting items set to ON or selected.

When each of the above-mentioned setting items is set to OFF, the answer to the question of each of the steps S602 and S604 in FIG. 6 becomes affirmative (YES), and the answers to the questions of the respective steps S606 to S611 become negative (NO). As a consequence, the system controller 101 determines that the automatic deletion condition has not been satisfied.

As described hereinbefore, in determining a camera condition, a predetermined reference value is set by taking into account instantaneous variations and minute changes due to noise and characteristics of hardware, and when the camera condition exceeds the predetermined reference value, the system controller 101 determines that the camera condition has been changed.

In the above-described embodiment, when one of the camera conditions is satisfied, it is determined that the automatic deletion condition is satisfied. However, it may be determined that the automatic deletion condition is satisfied, when a plurality of camera conditions are simultaneously satisfied.

As described above, according to the present embodiment, when the shooting condition has changed, a display item, such as a title, is deleted without a special user operation, so that it is possible to delete a video effect superimposed on a moving image, in timing desired by a user, irrespective of the motion of an object.

Note that although in the above description, a display item, such as a title, is input via the touch panel, another input device may be used to input the display item.

Further, although in the above example, a display item, such as a title superimposed on a moving image, is recorded in the storage medium together with the moving image, the display item and the moving image may be recorded separately, or without being superimposed, from each other. In this case, for example, the display item is stored as image information different from the moving image (moving image file), together with time information displayed as a moving image is shot (this information is indicative of a position in the duration of the moving image where the display item is to be superimposed; a frame number or the like may be also used). Then, the system controller 101 and the image processing section 102 combines the display item and the moving image (i.e. superimposes the display item on the moving image) based on the time information before reproduction of the moving image, and reproduces and displays the synthesized image.

As is apparent from the above, in FIG. 1, the image pickup section 106 functions as an image pickup unit. The storage medium 122, the memory controller 108, and the system controller 101 function as a recording control unit for controlling to record a moving image having a display item superimposed thereon. The system controller 101 functions as a control unit. Further, in FIG. 1, The system controller 101, the image processing section 102, and the photographic lens 104 function as a focus control unit, and the system controller 101 functions as a focus determination unit. In addition, the system controller 101 functions as a zoom control unit and a zoom determination unit.

The shutter 105, the image processing section 102, and the system controller 101 function as an exposure control unit, and the system controller 101 functions as an exposure determination unit. Further, the system controller 101 and the image processing section 102 function as a white balance control unit, and the system controller 101 functions a white balance determination unit.

In addition, the system controller 101 and the image processing section 102 function as a face detection unit, and the system controller 101 functions as a face determination unit. Further, a motion detection section 125, such as the gyro sensor, and the system controller 101 function as the motion detection unit, and the system controller 101 functions as a motion determination unit.

The console section 115 and the display section 111 function as a time setting unit, an automatic deletion-setting unit, a delete input unit (delete button), a receiving unit.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

For example, it is possible to employ the functions of the above-described embodiment as a control method, and cause the camera to execute the control method. A control program having the functions of the above-described embodiment may be executed by a computer provided in the camera.

In this case, each of the control method and the control program includes at least an item input step, a superimposition step, and a delete control step. The control program is stored e.g. in a computer-readable storage medium.

Note that control of the system controller 101 may be performed by a single piece of hardware, or alternatively, the processing may be shared by a plurality of pieces of hardware so as to control the overall operation of the apparatus.

Although in the above-described embodiment, the present invention is applied to a digital video camera, this is not limitative, but the present invention can also be applied to any other image pickup apparatus that is capable of picking up and recording a moving image. For example, the present invention is applicable to a portable telephone terminal with a camera.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

This application claims priority from Japanese Patent Application No. 2010-257772 filed Nov. 18, 2010, which is hereby incorporated by reference herein in its entirety.

What is claimed is:

1. An image pickup apparatus comprising:
   an image pickup unit;
   a recording control unit configured to perform control to record, together with a moving image taken by said image pickup unit, a display item superimposed on the moving image during taking of the moving image by said image pickup unit; and
   a control unit configured to be operable when a specific shooting condition has changed during taking of the moving image by said image pickup unit, to perform control to inhibit recording of the display item together with the moving image by said recording control unit.

2. The image pickup apparatus according to claim 1, wherein said recording control unit performs control to record video data in which the display item is superimposed on the moving image.

3. The image pickup apparatus according to claim 1, wherein said recording control unit performs control to record a moving image which has not had the display item superimposed thereon in association with information indicative of a position in duration of the moving image where the display item is to be superimposed.

4. The image pickup apparatus according to claim 1, further comprising a display control unit configured to perform control to display the display item on a display unit during the taking of the moving image by said image pickup unit, in a state superimposed on the moving image, and
   wherein when the specific shooting condition has changed during the taking of the moving image by said image pickup unit, said control unit performs control to delete the display item displayed by said display control unit in a state superimposed on the moving image.

5. The image pickup apparatus according to claim 1, comprising a focus control unit configured to control a focus position for the moving image, and
   a focus determination unit configured to be operable when an amount of change in the focus position controlled by said focus control unit exceeds a predetermined focus change amount, to determine that the specific shooting condition has changed.

6. The image pickup apparatus according to claim 1, comprising a zoom control unit configured to perform zooming of the moving image, and
   a zoom determination unit configured to be operable when an amount of change in zoom during zooming performed by said zoom control unit exceeds a predetermined zoom change amount, to determine that the specific shooting condition has changed.

7. The image pickup apparatus according to claim 1, comprising an exposure control unit configured to control exposure for the moving image, and
   an exposure determination unit configured to be operable when an amount of change in the exposure changed by said exposure control unit exceeds a predetermined exposure change amount, to determine that the specific shooting condition has changed.

8. The image pickup apparatus according to claim 1, comprising a white balance control unit configured to control white balance for the moving image, and
   a white balance determination unit configured to be operable when an amount of change in the white balance changed by said white balance control unit exceeds a predetermined white balance change amount, to determine that the specific shooting condition has changed.

9. The image pickup apparatus according to claim 1, comprising a face detection unit configured to detect a human face in the moving image, and
   a face determination unit configured to be operable when said face detection unit detects a human face in the moving image, to determine that the specific shooting condition has changed.

10. The image pickup apparatus according to claim 1, comprising a motion detection unit configured to detect a motion of the image pickup apparatus, and
    a motion determination unit configured to be operable when an amount of change in the motion of the image pickup apparatus detected by said motion detection unit exceeds a predetermined motion change amount, to determine that the specific shooting condition has changed.

11. The image pickup apparatus according to claim 1, comprising a clock unit configured to measure an elapsed time after starting the recording of the display item together with the moving image, and
    wherein when the elapsed time measured by said clock unit is not longer than a predetermined time period, said control unit continues the recording of the display item together with the moving image by said recording control unit, irrespective of whether or not the specific shooting condition has changed.

12. The image pickup apparatus according to claim 11, comprising a time setting unit configured to set the predetermined time period.

13. The image pickup apparatus according to claim 1, comprising a clock unit configured to measure an elapsed time period having after starting recording of the display item together with the moving image, and
    wherein when the elapsed time measured by said clock unit is longer than a predetermined time period, said control unit performs control to inhibit the recording of the display item together with the moving image by said recording control unit, irrespective of whether or not the specific shooting condition has changed.

14. The image pickup apparatus according to claim 13, comprising a time setting unit configured to set the predetermined time period.

15. The image pickup apparatus according to claim 1, comprising an automatic deletion-setting unit configured to set automatic deletion of the display item, and
    wherein when the automatic deletion is set by said automatic deletion-setting unit, said control unit performs control to inhibit the recording of the display item together with the moving image by said recording control unit, when the specific shooting condition has changed.

16. The image pickup apparatus according to claim 1, comprising a delete input unit configured to be operated for deleting the display item, and
wherein when said delete input unit is operated, said control unit performs control to inhibit the recording of the display item together with the moving image by said recording control unit, irrespective of whether or not the specific shooting condition has changed.

17. The image pickup apparatus according to claim 1, comprising a receiving unit configured to receive input of the display item from a user.

18. The image pickup apparatus according to claim 17, wherein said receiving unit is a touch panel, and
wherein the display item is generated by handwriting by the user which is received via said touch panel.

19. A method of controlling an image pickup apparatus including an image pickup unit, comprising:
performing control to record, together with a moving image taken by the image pickup unit, a display item superimposed on the moving image during taking of the moving image by said image pickup unit; and
performing control, when a specific shooting condition has changed during taking of the moving image by the image pickup unit, to inhibit recording of the display item together with the moving image.

20. A non-transitory storage medium storing a program for causing a computer to carry out a method of controlling an image pickup apparatus including an image pickup unit, wherein the method comprises:
performing control to record, together with a moving image taken by the image pickup unit, a display item superimposed on the moving image during taking of the moving image by said image pickup unit; and
performing control, when a specific shooting condition has changed during taking of the moving image by the image pickup unit, to inhibit recording of the display item together with the moving image.

21. A moving image-recording apparatus comprising:
a recording control unit configured to perform, at the time of image taking of moving images by an image pickup unit, control to record, together with a moving image, a display item superimposed on the moving image; and
a control unit configured to be operable when a result obtained by analyzing the moving image satisfies a specific condition during recording of the moving image by said recording control unit, to perform control to inhibit recording of the display item together with the moving image by said recording control unit.

22. The moving image-recording apparatus according to claim 21, further comprising an object detection unit configured to analyze the moving image to thereby detect a specific object, and
wherein the specific condition is that the specific object has been detected by said object detection unit.

23. The moving image-recording apparatus according to claim 22, wherein the specific object is a human face.

24. The moving image-recording apparatus according to claim 21, comprising an automatic deletion-setting unit configured to set automatic deletion of the display item, and
wherein when the automatic deletion is set by said automatic deletion-setting unit, said control unit performs control to inhibit the recording of the display item together with the moving image by said recording control unit, when the specific condition has changed.

25. A method of controlling a moving image-recording apparatus, comprising:
performing, at the time of image taking of moving images by an image pickup unit, control to record, together with a moving image, a display item superimposed on the moving image; and
performing control, when a result obtained by analyzing the moving image satisfies a specific condition during recording of the moving image, to inhibit recording of the display item together with the moving image.

26. A non-transitory storage medium storing a program for causing a computer to carry out a method of controlling a moving image-recording apparatus, comprising:
performing, at the time of image taking of moving images by an image pickup unit, control to record, together with a moving image, a display item superimposed on the moving image; and
performing control, when a result obtained by analyzing the moving image satisfies a specific condition during recording of the moving image, to inhibit recording of the display item together with the moving image.

* * * * *